MAGNETIC-SOUND-TRACK MOTION PICTURE APPARATUS

Filed Jan. 22, 1957 2 Sheets-Sheet 1

INVENTORS
ERIC M. BERNDT
WALTER H. BACH
BY Fulwider Mattingly & Huntley
Attorneys

MAGNETIC-SOUND-TRACK MOTION PICTURE APPARATUS

Filed Jan. 22, 1957 2 Sheets-Sheet 2

INVENTORS
ERIC M. BERNDT
WALTER H. BACH
BY Fulwider Mattingly & Huntley
Attorneys United States Patent Office 3,040,134
Patented June 19, 1962

3,040,134
MAGNETIC-SOUND-TRACK MOTION PICTURE APPARATUS

Eric M. Berndt, North Hollywood, and Walter H. Bach, Los Angeles, Calif., assignors to Bach Auricon, Inc., Los Angeles, Calif., a corporation of California
Filed Jan. 22, 1957, Ser. No. 635,168
10 Claims. (Cl. 179—100.2)

The present invention relates generally to magnetic-sound-track motion picture systems and more particularly to an apparatus for adapting a motion picture camera, not otherwise capable, to record sound signals upon a magnetizable sound track of a motion picture film.

Motion picture systems have primarily employed either photo-optical or magnetic means to record sounds which accompany the optical images recorded upon the film. Certain advantages exist in favor of each of these methods, and therefore both are widely used. Most motion picture cameras, however, are so built as to be capable only of recording sound photo-optically, and therefore are unable to use magnetic sound-track film with its accompanying advantages in certain situations.

In magnetically-recorded-sound motion picture systems, a track of magnetizable material is placed along one edge of the film, usually on the other side from the photographic emulsion. Magnetic transducer heads are then positioned in contact with the magnetic sound track to record and read sound signals. A roller is normally provided which is urged against the magnetic transducer heads. The film then passes between the roller and the heads and in this manner the magnetic sound track is held in sliding contact with the heads. In threading film into such a system it is necessary to move the magnetic transducer heads away from the roller against which they are urged, so that the film may be passed between these members. The arrangement for moving the magnetic transducer heads away from the roller should be simple in structure and easy to manipulate.

As motion picture film is moved over the roller opposing the transducer heads during recording or reproducing intervals, the roller tends to pick up small metallic particles which due to the relative movement of the roller past the head interfere with the reproduction of the sound. It is therefore desirable to maintain this so-called roller or back-up means stationary so that the film slides over it. However, since the photo-emulsion is on the opposite side of the film, this mode of operation sliding would necessitate that the emulsion side of the film rub against the back-up means and the emulsion may be scratched.

The present invention in its more general form provides an apparatus for rapidly adapting a motion picture camera which records sound signals photo-electrically to record sound signals magneticaly. The adapting apparatus further includes a mechanism by which magnetic transducer heads may be rapidly and effortlessly removed from their operative positions. In addition, the apparatus provides a back-up assembly for magnetic-sound track film for holding the film against the transducer heads, wherein the portion of said back-up assembly located under the magnetic-sound track remains fixed to thereby afford best operation for the sound track, and whereby the portion of the back-up assembly located under the picture portion of the film is allowed to revolve such that the emulsion upon the film is not scratched or worn.

With the foregoing in mind it is a major object of the present invention to provide improved apparatus for adapting a photo-optical sound recording camera to record sound signals upon magnetic-sound-track film.

It is another object of the invention to provide apparatus for transducing the magnetic-sound track of a motion picture film through which film may be easily threaded.

Still another object of the present invention is to provide apparatus for handling magnetic-sound-track film wherein the magnetic sound track may be transduced under optimum conditions without scarring the picture portion of the film.

The foregoing and additional objects and advantages of the invention will become apparent from consideration of the detailed description of the invention, such consideration being given to the attached drawings in which.

Figure 1:
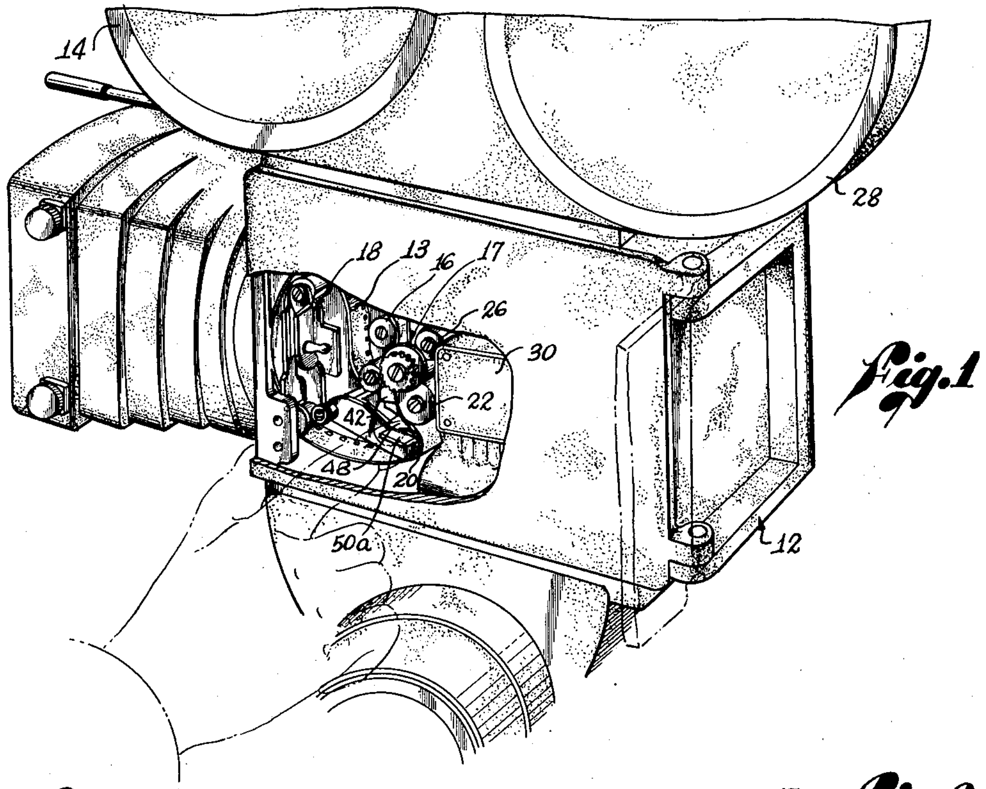
FIGURE 1 is a perspective view of a camera embodying the present invention set up to record sound signals upon a magnetic sound track.

Referring now to the drawings, and particularly to FIGURE 1, it will be seen that the reference character 12 indicates a motion picture camera of more or less conventional design. The film 13 used in the camera 12 is of the type having perforations in one edge only, the other edge being left unperforated to provide space for a sound track which may comprise a stripe of magnetizable material. Film in the camera 12 leaves a supply magazine 14, and is driven over suitable rollers 16 by a drive sprocket 17 to a film gate 18. After passing through the film gate 18, the film 13 passes over a drum or roller 20 which serves to maintain the film 13 in contact with a large segment of a drum assembly 22. The drum assembly 22 is adjacent the drive sprocket 17 which now serves to motivate the film over rollers 26 to be returned to a pick-up magazine 28.

The sound track of the film 13 is positioned along one edge of the film and is transduced by magnetic transducer heads which are positioned such as to be urged against the drum assembly 22. The view of the camera 12 in FIGURE 1 is not such as to show these transducer heads. A recording galvanometer system 30 is positioned to the right of the sprocket 17, and serves in conventional manner to record an optical sound track on the film 13 when film of that type is being used.

Figures 2, 3:
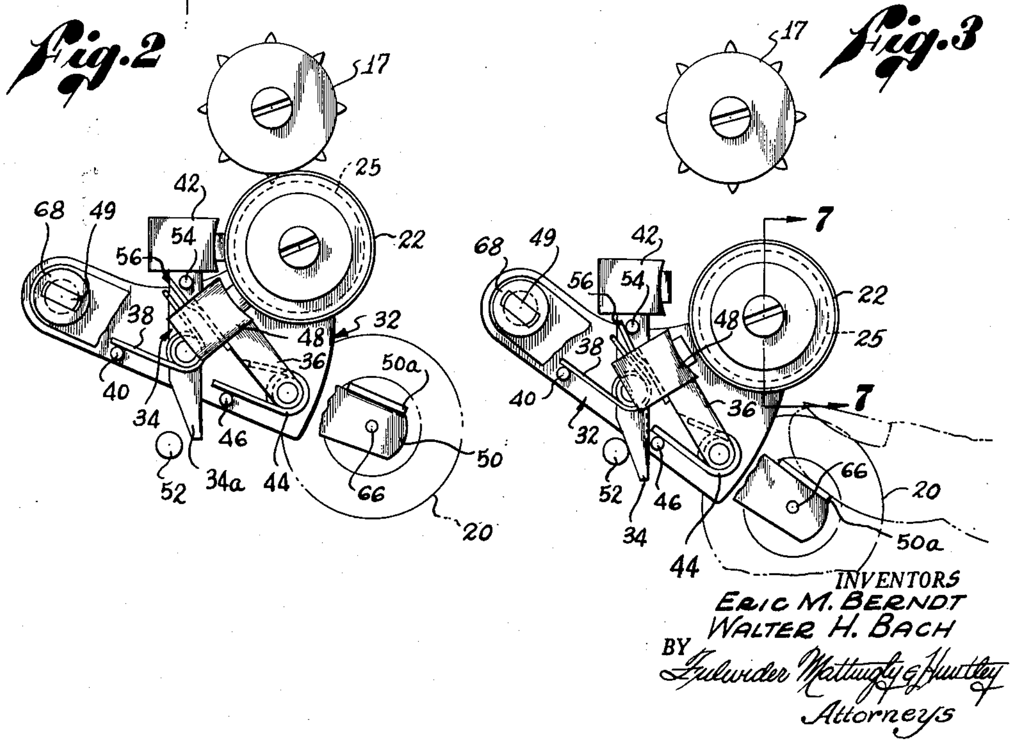
FIGURE 2 is a view of apparatus embodying the invention shown in an operating position.
FIGURE 3 is a view of an apparatus embodying the invention shown in a position to receive film.

For a detailed description of the magnetic recording system reference should now be had to FIGURES 2 and 3. In FIGURES 2 and 3 the drum assembly 22 is shown in more detail. This drum assembly 22 includes a section 70 rotatively mounted upon a swingable frame 32 which also carries pivotally mounted levers 34 and 36. The lever 34 is mounted in conjunction with a spring 38 which contacts a pin 40, such as to cause a magnetic transducer head 42, mounted upon the lever 34, to be urged against an edge of the arcuate surface of the drum assembly 22. The lever 36 is acted upon by a spring 44 which is held in position by a pin 46. The action of the spring 44 is such as to cause a magnetic transducer head 48 mounted on the lever 36, to be urged against the drum assembly 22 at a location in line with the head 42.

Thus the two magnetic transducer heads 42 and 48 (one recording and the other play-back) both contact a single sound track, and are provided in this recording system, so that the recording head 48 may record upon the sound track and the play-back head 42 may monitor the sound signal immediately after it is recorded upon the track. This mode of recording and monitoring provides an immediate indication of the recorded sound signals and enables the operator of the camera to be assured that sound signals are in fact being properly recorded.

The entire frame 32 is pivotally mounted upon a shaft 49 and is urged in a counterclockwise direction by a spring (to be later shown and described) so as to hold the assembly in the position shown in FIGURE 2 with respect to the sprocket 17. An annular recess 25 is provided in the drum assembly 22 to accommodate the teeth of the sprocket 17.

When it is desired to insert film into a system including the sound recording apparatus shown in FIGURE 2, the frame 32 will be depressed by applying finger-tip pressure to a tab 50*a* of a key 50. Such pressure is shown to be exerted by a phantom hand in FIGURE 1. Upon so applying pressure, the frame 32 will be swung clockwise about the shaft 49, thereby moving the drum assembly 22 away from the sprocket 17.

As the frame 32 is pivoted, a lower projection 34*a* on the lever 34 engages a fixed pin 52, and as an inclined edge surface on the projection 34*a* is moved in engagement with the pin 52, the lever 34 is moved in a counterclockwise manner about its pivot point, thereby removing the head 42 from contact with the drum assembly 22. The head 42 is so shown in FIGURE 3.

When the lever 34 is motivated in the manner explained above, a pin 54, mounted upon the lever 34 will contact an arm 56 connected to the lever 36, and cause this lever 36 to be rotated about its pivot point in a counterclockwise manner. As the lever 36 is so rotated the head 48 will be withdrawn from the drum assembly 22.

It may therefore be seen, that upon exerting a pressure upon the tab 50*a* to swing the frame 32 about the shaft 49, the drum assembly 22 will be moved away from the sprocket 17 and both the magnetic transducer heads 42 and 48 will be withdrawn from contact with the drum assembly 22. The arcuate surface of the drum assembly 22 is thus open to receive the film. Therefore an extremely simple mechanism is provided which enables rapid threading of the film between the drum assembly 22 and the sprocket 17 and the heads 42 and 48.

Figure 4:
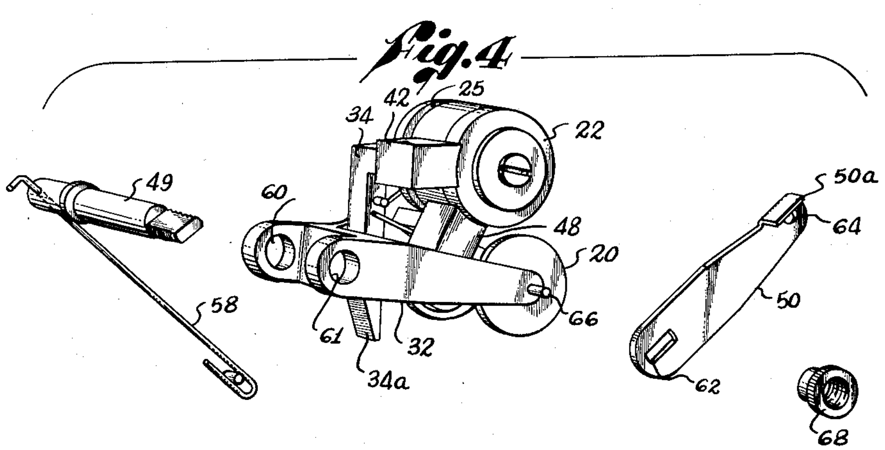
FIGURE 4 is a horizontally exploded perspective view of an apparatus embodying the invention.
Figure 5:
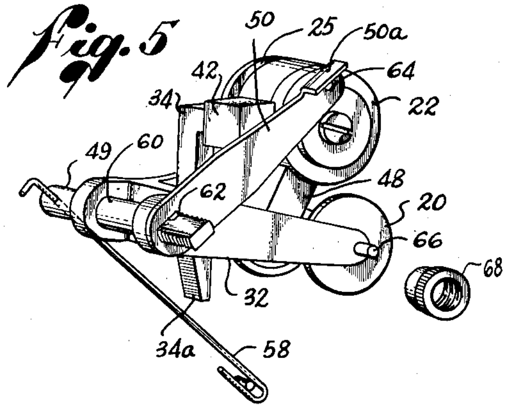
FIGURE 5 is a perspective view of an apparatus embodying the invention, showing the apparatus partially installed.
Figure 6:
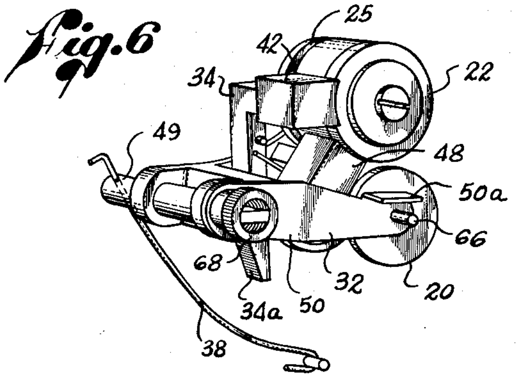
FIGURE 6 is a perspective view of an apparatus embodying the invention, shown fully installed.

Reference will now be had to FIGURES 4, 5 and 6, which illustrate the manner in which apparatus embodying the invention may be installed upon a motion picture camera. Referring to FIGURE 4, there is shown the shaft 49 which is rotatably mounted within the film transport chamber of the motion picture camera 12. Attached to the shaft 49 is a spring 58 which is so mounted as to urge counterclockwise rotation of the shaft.

The shaft 49 mounts the frame 32 by means of apertures 60 and 61 in the frame 32 which receive the shaft 49. After the frame 32 has been positioned upon the shaft 49, the key 50 is placed upon the shaft 49, a slot 62 in the key 50 being positioned over a flat portion of the shaft 49 such that the key 50 must rotate with the shaft 49. The key 50 is then rotated with respect to the frame 32 to the position as shown in FIGURE 6 whereupon an aperture 64 in the key 50 receives a pin 66 to lock the key 50 to the frame. With the key 50 so held, the entire frame 32 will be urged upwardly by the spring 58, and thus the drum assembly 22 will be held in contact with the sprocket 17 as shown in FIGURE 2.

A nut 68 is now threaded upon the shaft 49 as a final operation in the installation so as to retain the key 50 and the frame 32 in place on the shaft 49.

In the event that it is desired to utilize the camera to record photo-optically upon film, the magnetic recording apparatus is removed simply by removing the nut 68, disengaging the pin 66 from the aperture 64, and then removing the key 50 from the shaft 35. The frame assembly 32 then may be removed from the shaft 35 and a standard roller may then replace the apparatus embodying the invention. As an alternative arrangement the magnetic recording heads 42 and 48 may simply be removed from the apparatus when magnetic recording sound-track type film is not in use.

Figure 7:
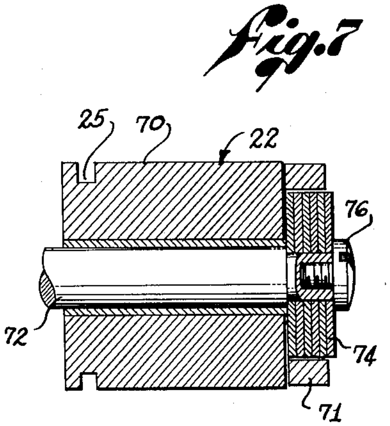
FIGURE 7 is an enlarged section taken along the line 7—7 of FIGURE 3.

Reference will now be had to FIGURE 7 which shows the details of the back-up means or drum assembly 22, embodying a mode of construction which enables magnetic-sound-track motion picture film to be handled in an improved fashion. The drum assembly 22 is divided into two equal diameter cylinders or on a common axis, i.e. sections 70 and 71. The section 70 is mounted to rotate freely upon a shaft 72 and is therefore a roller. The section 71, however, is fixed to the shaft 72 by a screw 76. The sections 70 and 71 may be made of nylon or other similar material, while washers 74 may be formed of a magnetic shielding material, e.g. soft iron. As previously explained, the section 70 carries an annular recess 25 to accommodate the teeth of the sprocket 17.

As motion picture film carrying a magnetic sound track is moved over the drum assembly 22, the surface of the film carrying the photographic emulsion will be in contact with the roller section 70. Accordingly, this section is rotatably mounted so as to move with the film and thereby prevent abrasive movement between its surface and the emulsion which would damage the emulsion. With regard to section 71, however, the back-up surface is held fixed so that the portion of the film which carries magnetic material slides with respect to the surface of section 71. It has been found, generally, that if the magnetic track is carried by a moving roller which is utilized to provide back pressure for magnetic transducer heads, small particles of iron or steel will accumulate about the film and upon the roller and cause interference in the sound signals. Therefore, best operation is afforded by causing the magnetic sound track to slide over the drum member utilized to provide back pressure for the magnetic transducer elements.

In addition, improved sound recording is afforded by providing shielding to the magnetic sound track in the form of the ferromagnetic washers 74. The drum assembly 22 therefore provides a greatly-improved film-handling member to be utilized to hold motion picture film against the magnetic transducer head, in such a manner that the photographic emulsion will not be scarred, while improved sound signals result.

With the apparatus of the invention installed upon a more or less conventional motion picture camera 12, which is otherwise incapable of recording sound signals magnetically, film is threaded into a camera in a fashion as shown in FIGURE 1. It is to be noted, that in so threading the film 13, it may be passed over the drum assembly 22, simply by exerting finger-tip pressure upon the key 50 as shown in FIGURE 1. Such pressure will retract the magnetic heads 42 and 48 from the drum assembly 22 and will disengage the drum assembly 22 from the sprocket 17. The drum assembly 22 is thus opened to receive the film 13.

With the film thus installed in the camera 12, the camera may be operated and the sounds which accompany the action being recorded photographically will be recorded upon the film. Of course conventional auxiliary apparatus will be required to convert sounds into electrical signals prior to recording. The electrical signals are applied to the magnetic transducer head 48 causing such signals to be magnetically recorded upon the magnetic sound track of the film. Immediately after these signals are recorded upon the sound track, they will be monitored by the transducer head 42 to be applied to a sound-reproducing system to provide the camera operator with an indication of the sound actually being recorded.

While the apparatus and methods shown and described herein are fully capable of achieving the objects and providing the advantages hereinbefore stated, it will be realized by those skilled in the art that they are capable of considerable modification without departing from the spirit of the invention. For this reason we do not mean to be limited to the forms shown and described herein, but rather to the scope of the appended claims.

We claim:

1. In a motion picture film-handling system wherein a stripe of magnetizable material on a film strip moving in a given path is contacted by a magnetic transducer head to effect sound signals, the improvement which comprises: a drum assembly for holding said film contiguous to said magnetic transducer head, said drum assembly being located on the opposite side of said path from said head and having a rotatably mounted section to contact a picture portion of said film and a fixed section to contact the sound track portion of said film.

2. In a motion picture film-handling system wherein a stripe of magnetizable material on a film strip moving in a given path is contacted by a magnetic transducer head to effect sound signals, the improvement which comprises: a drum assembly having a nylon arcuate surface for holding said film in said path and adjacent said magnetic transducer head; said drum assembly having a rotatably mounted section to contact a picture portion of said film and a fixed section to contact the sound track portion of said film to back up the same against pressure from said head and a ferromagnetic insert positioned within said fixed section.

3. A device for adapting a motion-picture camera to record sound upon the magnetizable track of a motion picture film comprising: a drum assembly mounted adjacent one surface of said film and including a roller section and a fixed section; a metallic shielding core positioned within said fixed section; means for directing said motion-picture film over said assembly to thereby engage the same; at least one magnetic transducer head mounted adjacent said assembly and abutting the opposite surface of said film; and means for urging said transducer head toward said assembly at a location where said motion-picture film engages the same.

4. A device for adapting a motion-picture camera to record sound upon the magnetizable track of a motion-picture film comprising: a drum assembly including a roller section and a fixed section; a metallic shielding core positioned within said fixed section; means for directing said motion-picture film over said assembly to thereby engage the same; at least one magnetic transducer head mounted adjacent said assembly but on the opposite side of the film therefrom; and means mounted at a pivot point including spring means for urging said magnetic transducer head toward said assembly and for withdrawing said magnetic transducer head from said assembly upon being motivated about said pivot point.

5. A device for adapting a motion-picture camera to record sound upon the magnetizable track of a motion-picture film comprising: a drum assembly including a roller section and a fixed section on a common axis; means for directing said motion-picture film over said assembly to thereby engage said assembly; a magnetic recording head and a magnetic play-back head mounted adjacent said assembly and on the opposite side of said film from said drum assembly; and means mounted at a pivot point including spring means for urging said heads towards said axis and for withdrawing said heads from said axis upon being motivated about said pivot point.

6. A magnetic sound track transducer apparatus comprising: a cylinder for guiding said magnetic sound track; a pivotally mounted frame carrying said cylinder with its axis spaced from the pivot point of said frame; first spring means for urging said cylinder in a predetermined direction; at least one magnetic transducer head; at least one lever pivotally mounted on said frame and carrying said transducer head; second spring means for urging said magnetic transducer head toward said cylinder; and a fixed element positioned so as to contact said lever when said pivotally-mounted frame is removed from said predetermined position to thereby withdraw said magnetic transducer head from said cylinder.

7. A magnetic sound track transducer apparatus comprising: a guide for said magnetic sound track; a pivotally mounted frame carrying said guide at a position removed from the pivot point of said frame; a sprocket wheel; first spring means for urging said guide to a predetermined position adjacent said sprocket wheel; at least one magnetic transducer head; at least one lever pivotally mounted upon said frame and carrying said transducer head for selective swinging movement away from said guide to permit insertion of a sound track strip between said head and guide and toward said guide to engage said head and guide with opposite sides of a strip so inserted; second spring means for urging said magnetic transducer head toward said guide; and a fixed element positioned such as to contact said lever when said pivotally-mounted frame is removed from said predetermined position to thereby withdraw said magnetic transducer head from said guide.

8. A magnetic sound track transducer apparatus comprising: a guide for said magnetic sound track; a pivotally-mounted frame carrying said guide on an axis spaced from the pivot point of said frame; first spring means for urging said guide in a predetermined direction; a first magnetic transducer head; a first lever pivotally mounted on said frame and carrying said first transducer head; a second magnetic transducer head, a second lever pivotally mounted on said frame and carrying said second transducer head; each of said levers carrying its respective head for swinging movement toward, and away from said guide whereby to permit selectively insertion of a sound track strip between said guide and heads and engagement of said heads and guide with opposite sides of a strip so inserted; second spring means for urging said first magnetic transducer head toward said guide; third spring means for urging said second magnetic transducer head toward said guide; and a fixed element positioned so as to contact said first lever when said pivotally-mounted frame is removed from said predetermined position to thereby withdraw said first magnetic transducer head from said guide; said first and said second levers being so positioned that when said first lever is moved said second lever will be engaged by said first member to thereby withdraw said second magnetic transducer head from said guide.

9. A magnetic sound track transducer apparatus comprising: a guide for said magnetic sound track; a pivotally mounted frame carrying said guide on an axis spaced from the pivot point of said frame; a sprocket wheel; first spring means for urging said guide against said sprocket wheel; a first magnetic transducer head; a first lever pivotally mounted on said frame and carrying said first transducer head; a second magnetic transducer head; a second lever pivotally mounted on said frame and carrying said second transducer head; each of said levers carrying its respective head for swinging movement toward, and away from said guide whereby to permit selectively insertion of a sound track strip between said guide and heads and engagement of said heads and guide with opposite sides of a strip so inserted; second spring means for urging said first magnetic transducer head toward said guide; third spring means for urging said second magnetic transducer head toward said guide; a fixed element positioned so as to contact said lever when said pivotally-mounted frame is removed from said sprocket wheel to thereby withdraw said magnetic transducer head from said guide; and said first and said second levers being so positioned that when said first lever is moved said second lever will be engaged by said first member to thereby withdraw said second magnetic transducer head from said guide.

10. A magnetic sound track transducer apparatus comprising: a guide for said magnetic sound track; mounting means for movably mounting said guide to guide the same in a given path; first spring means for urging said guide in a predetermined direction; at least one magnetic transducer head; means for attaching said magnetic transducer head to said mounting means on the opposite side of said path from said guide; second spring means for urging said magnetic transducer head toward said guide; and means for withdrawing said magnetic transducer head from said guide when said guide is urged in a direction opposed to said predetermined direction.

References Cited in the file of this patent

UNITED STATES PATENTS

| | | |
|---|---|---|
| 2,605,364 | Masterson | July 29, 1952 |
| 2,678,357 | Schuessler | May 11, 1954 |
| 2,705,640 | Del Valle | Apr. 5, 1955 |
| 2,725,784 | Evans | Dec. 6, 1955 |
| 2,773,416 | Kleinerman | Dec. 11, 1956 |

UNITED STATES PATENT OFFICE

CERTIFICATE OF CORRECTION

Patent No. 3,040,134 June 19, 1962

Eric M. Berndt et al.

It is hereby certified that error appears in the above numbered patent requiring correction and that the said Letters Patent should read as corrected below.

Column 7, line 2, after "track" and before the semicolon insert -- to guide the same in a given path --; lines 3 and 4, strike out "to guide the same in a given path".

Signed and sealed this 16th day of October 1962.

(SEAL)
Attest:

ERNEST W. SWIDER
Attesting Officer

DAVID L. LADD
Commissioner of Patents